United States Patent
Wang

(10) Patent No.: US 7,623,735 B2
(45) Date of Patent: *Nov. 24, 2009

(54) METHOD FOR DIFFERENTIATING DYNAMIC RANGE OF IMAGE

(76) Inventor: Kuo-Jeng Wang, 14, Kung-An St., Hsiao-Kang, Kaohsiung City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/834,522

(22) Filed: Aug. 6, 2007

(65) Prior Publication Data

US 2007/0297670 A1    Dec. 27, 2007

Related U.S. Application Data

(63) Continuation of application No. 11/336,295, filed on Jan. 19, 2006, now Pat. No. 7,269,283, which is a continuation of application No. 10/281,307, filed on Oct. 28, 2002, now Pat. No. 7,050,628.

(51) Int. Cl.
*G06K 9/36* (2006.01)

(52) U.S. Cl. ..................... 382/286; 382/170

(58) Field of Classification Search .............. 382/168, 382/170, 172, 286
See application file for complete search history.

(56) References Cited

U.S. PATENT DOCUMENTS

| 6,061,091 A | 5/2000 | Van de Poel et al. |
| 7,050,628 B2* | 5/2006 | Wang .......................... 382/170 |
| 7,269,283 B2* | 9/2007 | Wang .......................... 382/170 |

* cited by examiner

*Primary Examiner*—Phuoc Tran
(74) *Attorney, Agent, or Firm*—Stolowitz Ford Cowger LLP

(57) ABSTRACT

A method for differentiating dynamic range of image is disclosed. The method comprises the following steps. First of all, pixel numbers with the same level value of Density units $D_n-1$ and $D_n$ are compared. Next the minimum pixel number of each level value of Density units $D_n-1$ and $D_n$ are counted. Then the minimum pixel numbers of each level value of Density units $D_n-1$ and $D_n$ are summed. Next the ratio of total minimum pixel number and total pixel number R and a specification value $R_s$ are compared. Then whether R is smaller than $R_s$ or not is determined so as to recognize whether Density units $D_n-1$ and $D_n$ could be differentiated or not.

36 Claims, 2 Drawing Sheets

METHOD FOR DIFFERENTIATING DYNAMIC RANGE OF IMAGE

This is a continuation of U.S. patent application Ser. No. 11/336,295 filed Jan. 19, 2006, now U.S. Pat. No. 7,269,283, entitled METHOD FOR DIFERENTIATING DYNAMIC RANGE OF IMAGE, which is a continuation of Ser. No. 10/281,307 filed Oct. 28, 2002, now U.S. Pat. No. 7,050,628, which is herein incorporated by reference in its entirety.

FIELD OF THE INVENTION

The present invention relates to a method for differentiating dynamic range of image, and more particularly to a method for differentiating density units in a dynamic range of image.

DESCRIPTION OF THE RELATED ART

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor or a CMOS sensor, or a CIS sensor), an analog amplifier, an analog to digital converter (ADC), a controller and a random access memory (RAM).

The CCD sensor includes a large number (e.g., 2000) of photoelectric sensing elements arranged in a linear array. Each photoelectric sensing element will capture light representing a single pixel of the image. The array will capture a link of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

Images of a target or a test chart finally generated by a scanner have density units with separate pixel-level distribution. Although density units have individual pixel-level distribution, the pixel-level distribution of density units could overlap so as to render the density units undistinguishable. Conventionally, density units $D_n$ and $D_{n+1}$ are differentiated by a standard deviation method, wherein when $D_n - 1/4S_n > D_{n+1} + 1/4S_{n+1}$, density units $D_n$ and $D_{n+1}$ are distinguishable. However, the standard deviation method still has several disadvantages. For example, when some obstacles or dust are present on a target or a test chart, the images of the obstacles or dust would interfere with the differentiation of density units by the standard deviation method.

Hence it is desirable to provide a method for differentiating dynamic range of an image to overcome the disadvantages of the conventional method.

SUMMARY OF THE INVENTION

It is therefore an object of the invention to provide a method for differentiating dynamic range of an image to exclude the interference of the differentiation of density units induced by obstacles on images.

To achieve these objects, and in accordance with the purpose of the invention, the invention provides a method for differentiating dynamic range of an image. The method comprises the following steps. First of all, pixel numbers with the same level value of Density units $D_{n-1}$ and $D_n$ are compared. Next the minimum pixel numbers of each level value of Density units $D_{n-1}$ and $D_n$ are counted. Then the minimum pixel numbers of each level value of Density units $D_{n-1}$ and $D_n$ are summed. Next the ratio of total minimum pixel number and total pixel number R and a specification value $R_s$ are compared. Then whether R is smaller than $R_s$ or not is determined so as to recognize whether Density units $D_{n-1}$ and $D_n$ could be differentiated or not. When the ratio R is smaller than the specification value $R_s$, the density units $D_{n-1}$ and $D_n$ are determined as distinguishable. When the ratio R is not smaller than the specification value $R_s$, the density units $D_{n-1}$ and $D_n$ are determined as undistinguishable.

Dynamic range of the image can also be differentiated by using an overlap area of pixel-level distributions of density units. Firstly, pixel-level distributions of density units $D_{n-1}$ and $D_n$ are provided. Then an overlap area of the pixel-level distributions of the density units $D_{n-1}$ and $D_n$ is counted and the overlap area is compared with a specification value. When the overlap area is smaller than the specification value, the density units $D_{n-1}$ and $D_n$ are determined as distinguishable. Instead, when the overlap area is not smaller than the specification value, the density units $D_{n-1}$ and $D_n$ are determined as undistinguishable.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the method for differentiating dynamic range of image described below do not cover a complete system and method. The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

Figure 1:
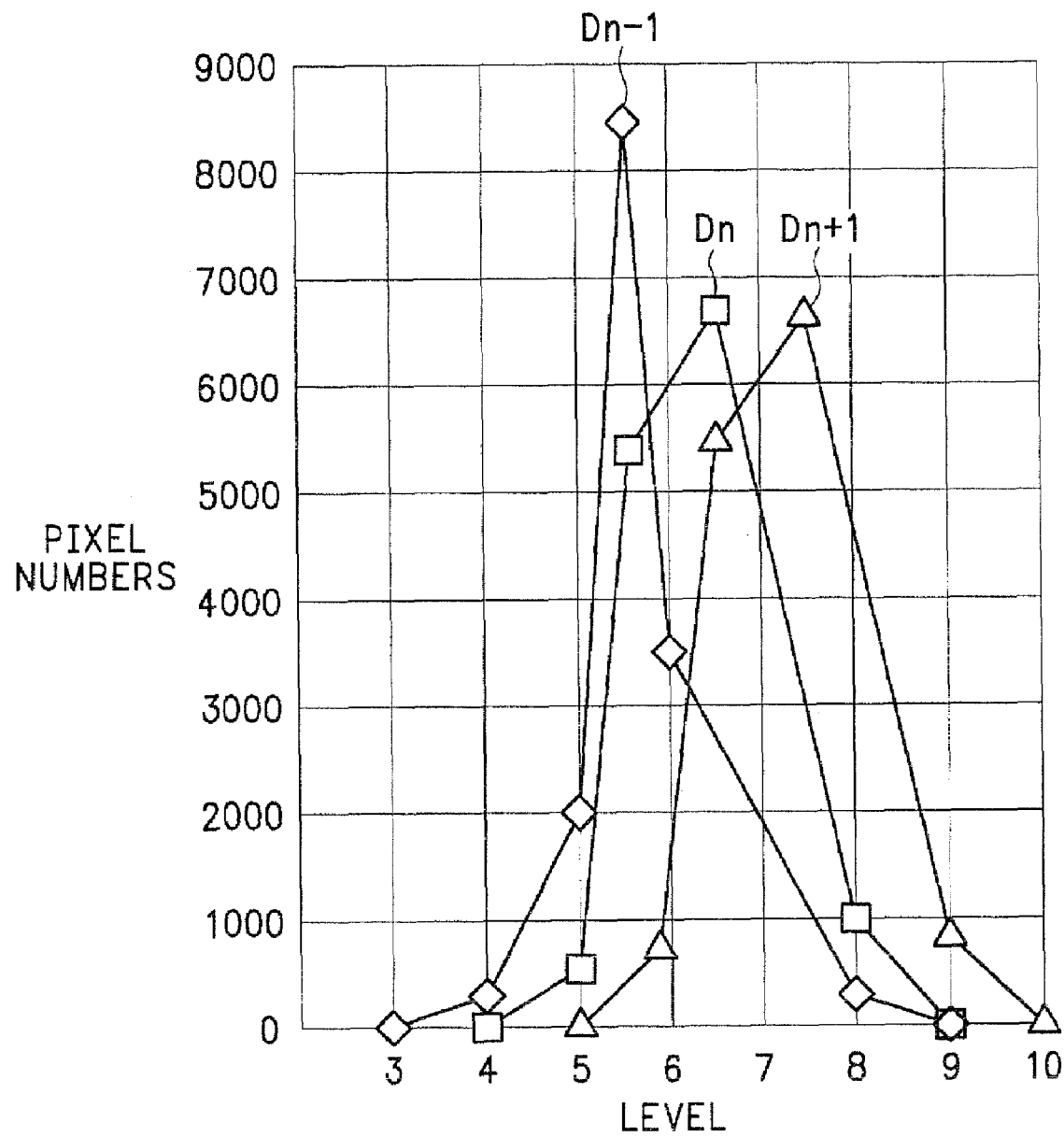
FIG. 1 shows a diagram of pixel number versus levels of an image of a target or a test chart.

Referring to FIG. 1, a diagram of pixel number versus level of an image of a target or a test chart is shown. Density units $D_{n-1}$, $D_n$ and $D_{n+1}$ separately have pixel-level distributions overlapped. Density unit $D_{n-1}$ has a pixel-level distribution which has one pixel with a minimum level value 3, over 8000 pixels with level 6 and 186 pixels with a minimum level value of 8. Most pixels of density unit $D_{n+1}$ have level values from 4 to 8. Density units $D_n$ has a pixel-level distribution which has 21 pixels with a minimum level of 4, over 6500 pixels with a level of 7 and 15 pixels with a maximum level value of 9. Most pixels of density unit $D_n$ have level values from 5 to 8. Density unit $D_{n+1}$ has a pixel-level distribution which as 1 pixel with a minimum level of 4, over 6500 pixels with a level of 8 and 15 pixels with a maximum level value of 10. Most pixels of density unit $D_{n+1}$ have level values from 6 to 9. The the pixel-level distributions of Density units $D_{n-1}$, $D_n$ and $D_{n+1}$ overlap with each other. Whether Density units $D_{n-1}$, $D_n$ and $D_{n+1}$ can be differentiated depends on the overlap areas of pixel-level distributions of Density units $D_{n-1}$, $D_n$ and $D_{n+1}$. The larger areas of pixel-level distribution Density unit overlap, the harder Density units are to differentiate. By comparing and counting the total pixel number with the same level value of Density units, Density units can be determined as distinguishable or undistinguishable. By setting a critical value of overlap area of pixel-level distributions of Density units, an image on a target or a test chart can be recognized as distinguishable or undistinguishable.

Table 1 further illustrates the pixel-level distributions of Density units $D_{n-1}$, $D_n$ and $D_{n+1}$ and the comparison and counting of the overlap area of Density units $D_{n-1}$, $D_n$ and $D_{n+1}$. By comparing and counting the pixels with the same level value of two adjacent Density units, total pixels with the same level value which would render the two adjacent Density units undistinguishable can be obtained. As shown in Table 1, by counting and summing the minimum pixel number of two adjacent Density units, the total pixel number of the overlap area between two adjacent Density units can be obtained. In Table 1, if a critical value of the total pixel number of the overlap area of Density units above which Density units are determined as undistinguishable is set as 7500, Density units $D_{n-1}$ and $D_n$ are undistinguishable while Density units $D_n$ and $D_{n+1}$ are distinguishable. The critical value can also be a ratio of the pixel number of the overlap area and total pixel number. For example, the critical value can be 7500/13926 or 0.5386. The overlap ratio between Density units $D_{n-1}$ and $D_n$ is 9700/13926 or 0.6966 and Density units $D_{n-1}$ and $D_n$ are undistinguishable. The overlap ratio between Density units $D_n$ and $D_{n+1}$ is 7407/13926 or 0.5319 and Density units $D_n$ and $D_{n+1}$ are distinguishable.

| Level | $D_{n-1}$ Pixels | $D_n$ Pixels | $D_{n+1}$ Pixels | Min. ($D_{n-1}$:$D_n$) | Min. ($D_n$:$D_{n+1}$) |
|---|---|---|---|---|---|
| 3 | 1 | 0 | 0 | 0 | 0 |
| 4 | 219 | 21 | 1 | 21 | 1 |
| 5 | 1965 | 454 | 8 | 454 | 8 |
| 6 | 8134 | 5618 | 639 | 5618 | 639 |
| 7 | 3421 | 6784 | 5710 | 3421 | 5710 |
| 8 | 186 | 1034 | 6655 | 186 | 1034 |
| 9 | 0 | 15 | 910 | 0 | 15 |
| 10 | 0 | 0 | 3 | 0 | 0 |
| Total | 13926 | 13926 | 13926 | 9700 | 7407 |

Figure 2:
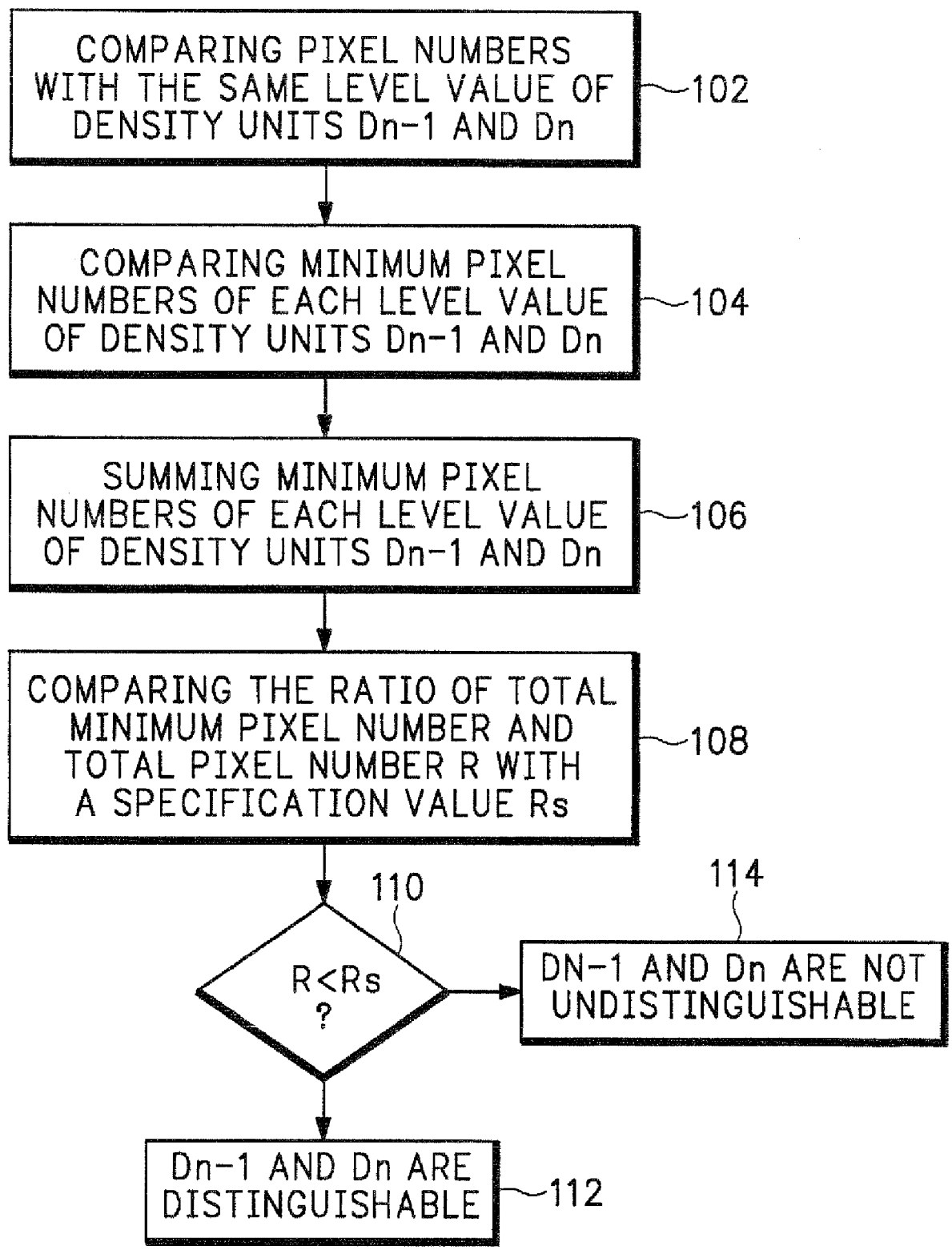
FIG. 2 shows a flow chart of the invention.

Referring to FIG. 2, a flow chart of the invention is shown. Density units of an image can be differentiated by the following steps. First of all, pixel numbers with the same level value of Density units $D_{n+1}$ and $D_n$ are compared in step 102. Next the minimum pixel numbers of each level value of Density units $D_{n-1}$ and $D_n$ are counted in step 104. Then the minimum pixel numbers of each level value of Density units $D_{n-1}$ and $D_n$ are summed in step 106. Next the ratio of total minimum pixel number and total pixel number R and a specification value $R_s$ are compared in step 108. Then whether R is smaller than $R_s$ or not is determined in step 110. If R is smaller than $R_s$, then Density units $D_{n-1}$ and $D_n$ are determined as distinguishable in step 112. If R is not smaller than $R_s$, then Density units $D_{n-1}$ and $D_n$ are determined as undistinguishable in step 114.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

The invention claimed is:

1. An apparatus, comprising:
    a memory configured to store data associated with an image; and
    a controller configured to identify pixel distributions for different density elements of the image, the controller further configured to use the identified pixel distributions to differentiate the different density elements.

2. The apparatus according to claim 1 wherein the controller is further configured to use the pixel distributions to exclude interference in the density elements induced by image obstacles.

3. The apparatus according to claim 1 wherein the controller is further configured to determine which density elements are distinguishable or undistinguishable according to an amount of overlap in the pixel distributions between the different density elements.

4. The apparatus according to claim 1 wherein the controller is further configured to:
    identify which pixel level values are common for the different density elements; and
    identify minimum pixel numbers for the identified pixel level values.

5. The apparatus according to claim 4 wherein the controller is further configured to:
    determine a total minimum pixel number for the identified minimum pixel numbers; and
    identify the density elements as distinguishable or undistinguishable by comparing the total minimum pixel number with a predetermined value.

6. The apparatus according to claim 4 wherein the controller is further configured to:
    determine a total minimum pixel number for the identified minimum pixel numbers;
    determine an overall total pixel number for the density elements;
    determine a ratio between the total minimum pixel number and the overall total pixel number; and
    identify the density elements as distinguishable or undistinguishable according to the determined ratio.

7. A method, comprising:
    storing image elements in a memory and analyzing the image elements using logic circuitry;
    identifying pixel-level distributions of the image elements;
    identifying an overlap area for the pixel-level distributions; and
    identifying the image elements as distinguishable or undistinguishable according to the identified overlap area.

8. The method according to claim 7 further comprising:
    identifying pixels for adjacent image elements having common level values;
    identifying minimum pixel numbers for the common level values;
    summing the minimum pixel numbers for the common level values; and
    identifying the image elements as distinguishable or undistinguishable according to the summed minimum pixel numbers.

9. The method according to claim 8 further comprising:
comparing the summed minimum pixel numbers with a predetermined value; and
identifying the image elements as distinguishable or undistinguishable according to the comparison.

10. The method according to claim 8 further comprising:
identifying a total number of pixels for the image elements;
identifying a ratio between the summed minimum pixel numbers and the identified total number of pixels; and
determining the image elements as distinguishable or undistinguishable according to the identified ratio.

11. The method according to claim 7 further comprising excluding the image elements induced by image obstacles.

12. A scanner, comprising:
a sensor configured to generate data associated with pixels; and
logic circuitry configured to detect pixel-level distributions for different density units and identify the pixels in the different density units having overlapping pixel-levels, the logic circuitry further configured to identify which of the different density units are distinguishable or undistinguishable according to the distribution of overlapping pixel-levels.

13. The scanner according to claim 12 wherein the logic circuitry is further configured to:
identify minimum pixel numbers for the overlapping pixel-levels;
sum the identified minimum pixel numbers for the overlapping pixel-levels; and
determine which of the different density units are distinguishable or undistinguishable according to the summed minimum pixel numbers.

14. The scanner according to claim 13 wherein the logic circuitry is further configured to:
compare the summed minimum pixel numbers with a predetermined value; and
identify which of the different density units are distinguishable or undistinguishable according to the comparison.

15. The scanner according to claim 12 wherein the logic circuitry is further configured to:
identify a total number of pixels for the density units;
identify a ratio between the summed minimum pixel numbers and the identified total number of pixels; and
determine which of the different density units are distinguishable or undistinguishable according to the identified ratio.

16. The scanner according to claim 12 wherein the logic circuitry is further configured to exclude the density units induced by image obstacles.

17. The scanner according to claim 12 wherein the logic circuitry is further configured to differentiate a dynamic range of the density units according to the identified overlapping pixel-levels.

18. The scanner according to claim 12 wherein the logic circuitry is further configured to:
compare pixel numbers with a same level value of density units $D_{n-1}$ and $D_n$;
count a minimum pixel number of each level value of density units $D_{n-1}$ and $D_n$;
sum the minimum pixel number of each level value of density units $D_{n-1}$ and $D_n$; and
compare a ratio of total minimum pixel number and total pixel number R with a specification value $R_s$.

19. The scanner according to claim 12 wherein the logic circuitry is further configured to:
provide pixel-level distributions of density units $D_{n-1}$ and $D_n$;
count an overlap area of the pixel-level distributions of the density units $D_{n-1}$ and $D_n$; and
compare the overlap area with a specification value.

20. A computer readable medium having instructions stored thereon that, when executed by a computer platform, result in:
receiving data associated with an image; and
identifying image distributions for different density elements of the image and using the identified image distributions to differentiate the different density elements.

21. The computer readable medium according to claim 20 further comprising using the image distributions to exclude interference in the density elements induced by image obstacles.

22. The computer readable medium according to claim 20 further comprising determining which density elements are distinguishable or undistinguishable according to an amount of overlap in the image distributions between the different density elements.

23. The computer readable medium according to claim 20 further comprising:
identifying what image level values are common for the different density elements; and
identifying minimum numbers for the identified image level values.

24. The computer readable medium according to claim 23 further comprising:
determining a total minimum number for the identified minimum numbers; and
identifying the density elements as distinguishable or undistinguishable by comparing the total minimum number with a predetermined value.

25. The computer readable medium according to claim 23 further comprising:
determining a total minimum number for the identified minimum numbers;
determining an overall total number for the density elements;
determining a ratio between the total minimum number and the overall total number; and
identifying the density elements as distinguishable or undistinguishable according to the determined ratio.

26. An apparatus, comprising:
means for obtaining data associated with pixels; and
means for identifying pixel-level distributions for different units, identifying the pixels in the different density units having overlapping pixel-levels, and identifying which of the different density units are distinguishable or undistinguishable according to the distribution of overlapping pixel-levels.

27. The apparatus according to claim 26 wherein the means for identifying pixel-level distributions is further configured to:
identify the minimum pixel numbers for the overlapping pixel-levels;
sum the identified minimum pixel numbers for the overlapping pixel-levels; and
determine which of the different density units are distinguishable or undistinguishable according to the summed minimum pixel numbers.

28. The apparatus according to claim 27 wherein the means for identifying pixel-level distributions is further configured to:
compare the summed minimum pixel numbers with a predetermined value; and identify which of the different density units are distinguishable or undistinguishable according to the comparison.

29. The apparatus according to claim 27 wherein the means for identifying pixel-level distributions is further configured to:
identify a total number of pixels for the density units;
identify a ratio between the summed minimum pixel numbers and the identified total number of pixels; and
determine which of the different density units are distinguishable or undistinguishable according to the identified ratio.

30. The apparatus according to claim 26 wherein the means for identifying pixel-level distributions is further configured to exclude the density units induced by image obstacles.

31. The apparatus according to claim 26 wherein the means for identifying pixel-level distributions is further configured to differentiate a dynamic range of the density units according to the identified overlapping pixel-levels.

32. The apparatus according to claim 26 wherein the means for identifying pixel-level distributions is further configured to:
compare pixel numbers with a same level value of density units $D_{n-1}$ and $D_n$;
count a minimum pixel number of each level value of density units $D_{n-1}$ and $D_n$;
sum the minimum pixel number of each level value of density units $D_{n-1}$ and $D_n$; and
compare a ratio of total minimum pixel number and total pixel number R with a specification value $R_s$.

33. The apparatus according to claim 26 wherein the means for identifying pixel-level distributions is further configured to:
provide pixel-level distributions of density units $D_{n-1}$ and $D_n$;
count an overlap area of the pixel-level distributions of the density units $D_{n-1}$ and $D_n$; and
compare the overlap area with a specification value.

34. A method, comprising:
instructing a device to store data associated with an image; and
instructing the device to identify pixel distributions for different distribution elements of the image and use the identified pixel distributions to differentiate the different distribution elements.

35. The method according to claim 34 further comprising instructing the device to use the pixel distributions to exclude interference in the distribution elements induced by image obstacles.

36. The method according to claim 34 further comprising instructing the device to determine which distribution elements are distinguishable or undistinguishable according to an amount of overlap in the pixel distributions between the different distribution elements.

* * * * *

UNITED STATES PATENT AND TRADEMARK OFFICE
CERTIFICATE OF CORRECTION

| | |
|---|---|
| PATENT NO. | : 7,623,735 B2 |
| APPLICATION NO. | : 11/834522 |
| DATED | : November 24, 2009 |
| INVENTOR(S) | : Wang |

It is certified that error appears in the above-identified patent and that said Letters Patent is hereby corrected as shown below:

First Page
Column 2 (Abstract), lines 1-11
DELETE:
"A method for differentiating dynamic range of image is disclosed. The method comprises the following steps. First of all, pixel numbers with the same level value of Density units $D_n$-1 and $D_n$ are compared. Next the minimum pixel number of each level value of Density units $D_n$-1 and $D_n$ are counted. Then the minimum pixel numbers of each level value of Density units $D_n$-1 and $D_n$ are summed. Next the ratio of total minimum pixel number and total pixel number R and a specification value $R_s$ are compared. Then whether R is smaller than $R_s$ or not is determined so as to recognize whether Density units $D_n$-1 and $D_n$ could be differentiated or not."
and INSERT:
-- A method for differentiating dynamic range of image is disclosed. The method comprises the following steps. First of all, pixel numbers with the same level value of Density units $D_{n-1}$ and $D_n$ are compared. Next the minimum pixel numbers of each level value of Density units $D_{n-1}$ and $D_n$ are counted. Then the minimum pixel numbers of each level value of Density units $D_{n-1}$ and $D_n$ are summed. Next the ratio of total minimum pixel number and total pixel number R and a specification value $R_s$ are compared. Then whether R is smaller than $R_s$ or not is determined so as to recognize whether Density units $D_{n-1}$ and $D_n$ could be differentiated or not. --, therefor.

| | |
|---|---|
| Column 1, line 6 | Delete "DIFERENTIATING" and insert -- DIFFERENTIATING --, therefor. |
| Column 4, line 29 | In Claim 4, delete "which" and insert -- what --, therefor. |
| Column 6, line 47-48 | In Claim 26, delete "different units," and insert -- different density units, --, therefor. |

Signed and Sealed this
Seventh Day of June, 2011

David J. Kappos
*Director of the United States Patent and Trademark Office*

CERTIFICATE OF CORRECTION (continued)
U.S. Pat. No. 7,623,735 B2

Column 6, line 56      In Claim 27, delete "the minimum" and insert
                       -- minimum --, therefor.